United States Patent [19]

Ernster, Sr.

[11] Patent Number: 5,429,829
[45] Date of Patent: Jul. 4, 1995

[54] CHEESE MANUFACTURING METHOD

[76] Inventor: John H. Ernster, Sr., 796 Via Somonte, Palos Verdes Estates, Calif. 90274

[21] Appl. No.: 61,456

[22] Filed: May 17, 1993

[51] Int. Cl.$^6$ .................. A23C 19/028; A23C 19/072
[52] U.S. Cl. ........................................ 426/36; 426/38; 426/40; 426/580; 426/582
[58] Field of Search .............. 426/36, 38, 40, 580, 426/582

[56] References Cited

U.S. PATENT DOCUMENTS

| | | | |
|---|---|---|---|
| 3,175,915 | 3/1965 | Murphy | 426/36 |
| 4,065,580 | 12/1977 | Feldman et al. | 426/36 |
| 4,248,897 | 2/1981 | Christensen et al. | 426/36 |
| 4,324,804 | 4/1982 | Davis | 426/36 |
| 4,379,170 | 4/1983 | Hettinga et al. | 426/40 |
| 4,597,971 | 7/1986 | Davis | 426/36 |
| 4,680,181 | 7/1987 | Leavitt et al. | 426/36 |
| 4,980,179 | 12/1990 | Koenraads et al. | 426/36 |
| 5,130,148 | 7/1992 | Brown et al. | 426/36 |

OTHER PUBLICATIONS

Kosikowski, F, 1966, Cheese and Fermented Milk Foods, Edward Brothers, Inc., Ann Arbar Mich., pp. 91–95, 102, 116, 117, 126, 127.

*Primary Examiner*—Helen Pratt
*Attorney, Agent, or Firm*—Paul M. Denk

[57] ABSTRACT

The cheese manufacturing process of this invention includes separating milk into skim milk and cream fractions, coagulating the the skim milk fraction at high temperature (120°–190° F.) to produce curds, and combining the curds with the cream fraction. The curds are preferably separated from whey and dehydrated prior to being combined with the cream. The fat content of the cream is increased before it is mixed with the curds. Cultured milk is added to the cream-curd mixture to regulate the moisture content of the resulting process cheese.

19 Claims, 1 Drawing Sheet

CHEESE MANUFACTURING METHOD

BACKGROUND OF THE INVENTION

This invention relates to a method of making cheese products, and in particular, to a method of producing cheeses in large quantities.

Due to increased consumption of natural cheese in the United States, natural cheese manufacturers continue to find a ready market for different varieties of cheese. With improvements in communication the market place has improved access to the individual manufacturers of different cheese varieties. This process has steadily eroded the ability of cheese processors (companies manufacturing pasteurized process and cold pack cheese from natural cheese) to procure large quantities of consistent quality natural cheese at reasonable prices.

This same change has resulted in increasing availability of so called "trim" which is the residue of cutting large pieces of cheese into retail portions. Unfortunately, cheese for cutting is usually produced at the legal maximum moisture content. Because of this, trim may have an aged flavor as well as contribute too much moisture to the eventual process cheese. In order to make a suitable process cheese the processor must procure so called "barrel" cheese, or american cheese with a low moisture content (usually 36%) to blend with available trim. Because of the low moisture content, barrel cheese does not rapidly age. The result is a very bland flavored, strong bodied cheese. It also allows the processor to meet moisture specifications required by federal and state laws. Because of the low moisture content of barrel cheese, yields are low. Since the processor must make a profit margin, prices paid must also be low. In years gone by this difference was offset by the reduced labor necessary to package the cheese in barrels and low sales cost (i.e., selling a large proportion of merchandise to a few large customers.) However, with the increase in factory automation the packaging advantages have been reduced and improved communication has made it possible for small remote factories to merchandise their wares in far away urban areas very effectively.

The result of these changes has been a significant decline in the number of companies willing to produce barrel cheese. This, of course, leads to increased competition for available supplies and significantly higher cost for process cheese manufacturers. On the other side of the picture the decline of available barrel cheese for blending has held back the amounts of trim that can be utilized resulting in lower trim prices to natural cheese manufactures.

SUMMARY OF THE INVENTION

One object of the present invention is to provide a method of producing cheese.

Another object is to provide such a method which has higher yields than current cheese production methods.

Another object is to provide such a method which can produce cheeses of consistent quality.

These and other objects will become apparent to those skilled in the art in light of the following disclosure and accompanying drawing.

The subject of this patent application seeks through alternate procedures to address these problems. This end is accomplished by producing a product with increased yield by utilizing albumin proteins (which are often wasted in typical cheese production), to produce a very bland flavored, very strong bodied cheese having a very low moisture content. Production of this product is also highly automated further increasing the economic benefits as well as improving quality and consistency.

The process includes separating milk into a cream fraction and a skim milk fraction, coagulating a part of the skim milk fraction to produce curd and whey, separating the curd from the whey, and mixing the curd with the cream fraction to produce process cheese. Milk is cultured and added to the curd-cream mixture to regulate the moisture content of the resulting cheese.

BRIEF DESCRIPTION OF THE DRAWING

The FIGURE is a block diagram of the cheese manufacturing process of the present invention.

DESCRIPTION OF THE PREFERRED EMBODIMENT

Figure 1:
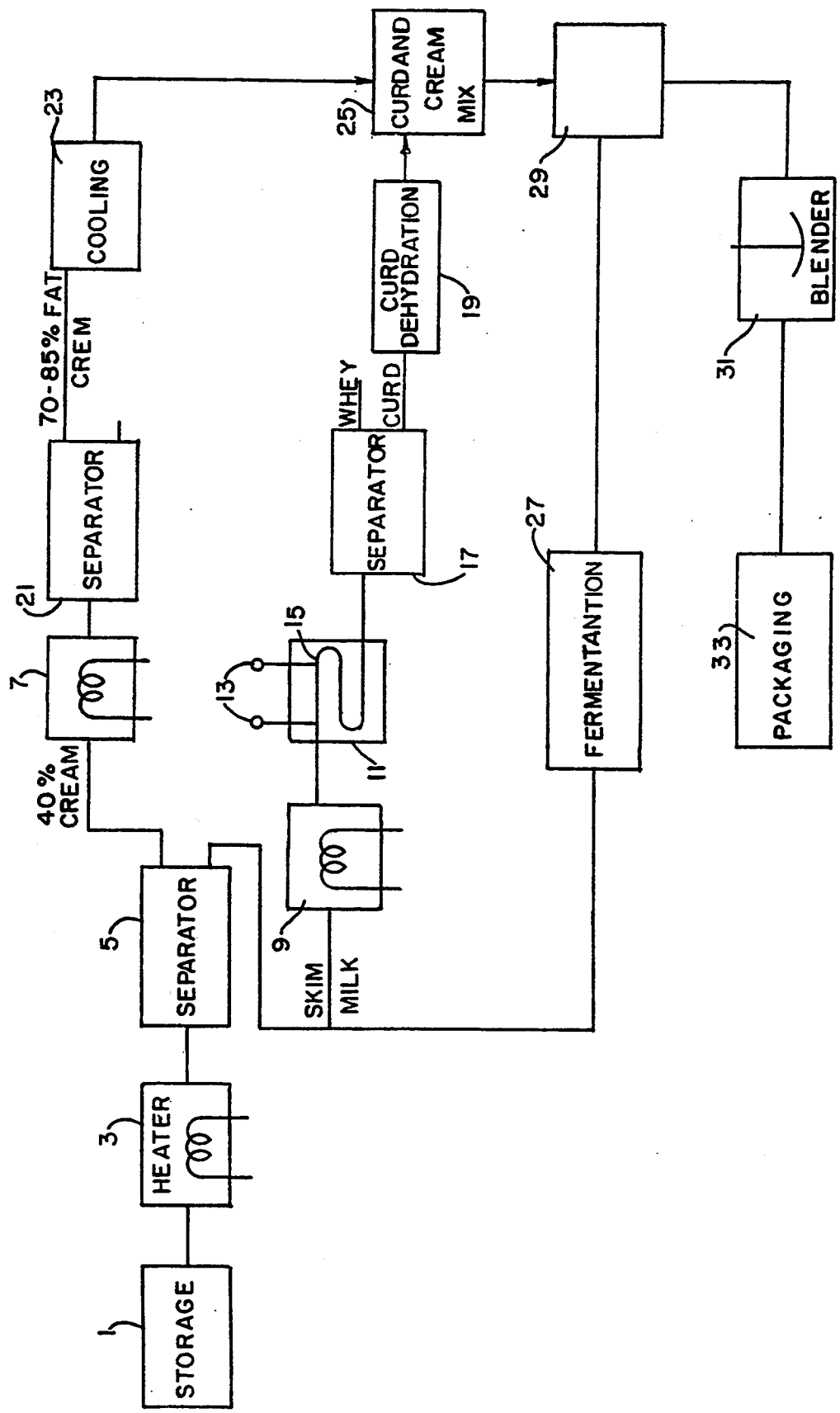

The process of the invention is shown in the drawing. Raw milk is received directly from the dairy farm and placed in a temporary holding tank 1 where it is tested. After testing, the milk is delivered to a heater 3 where it is heated. The milk is then separated at 5 into a cream fraction and skim milk fraction. The cream fraction is about 40% fat. The two fractions are separately pasteurized in heaters 7 and 9. A portion of the skim milk fraction is then heated in another heater 11 to 120°-190° F. The milk is coagulated in the heater by the addition of an acidulant, enzymes, and calcium chloride, which are injected from injectors 13 into a tube 15 or pipe in the proper proportions. The coagulation of the milk at these higher temperatures retains the albumin proteins. Most processes presently used to produce cheese omit the albumin. However, the retention of the albumin in the finished product improves the body of the finished process cheese. The coagulum or curd is cooked in the hot whey in heater 11 for from 1 to 20 minutes. After cooking the whey is separated at 17 from the coagulum, preferably by mechanical means. Preferably the whey/curd mixture is centrifuged to dewater the curd (i.e., separate the curd from the whey). However, other methods, such as pressing, may be used. The dewatered curd is then salted and evaporated at 19 to reduce the moisture content from 20% to 2%.

While the curd is being prepared, the 40% fat cream fraction is further separated at 21 to increase the fat content to between 70% and 90% while still hot. The cream is separated, preferably by centrifugal action, to increase its fat content. It is then cooled at 23 to 40°-95° F. The cooled cream can then be treated with lipolytic enzymes for flavor development or used as is.

The two components, curd and cream, are the conveyed to a blending device 25 and mixed together. The temperature of the mixture is typically 90° F.

Meanwhile, the plant milk or milk fraction which was not passed to heater 9 is precultured at 27 with a suitable bacterial culture (i.e., lactobacillus acidophilus, lactobacillus vulgaris etc.) This milk culture is then conveyed to a mixing device 29 and added in the proper proportions to the curd-cream mixture. The milk culture is generally between 10-30% of total mixture, depending on the desired finished product. The cultured milk is added to regulate the moisture content, and the proportions may be changed, as desired, to produce a cheese having a desired moisture content. If a higher moisture content is desired, the amount of cultured milk added is increased. This mass is then standardized in a blender 31 for moisture, fat, pH and salt in order to reach a desired consistency. After standardization the product is packaged at 33 in barrels or boxes and cooled to a refrigerated temperature for storage until it is shipped.

The finished product contains from 20–35% moisture, from 40–55% fat dry basis and from 0–3% salt. Final pH is from 5.0–6.5 and protein is from 20–35%. The finished product will contain the salient nutritional, vitamin, and mineral components to compare with cheddar cheese. It typically has a course, greasy body and exhibits some graininess. It can be produced uncolored or colored, with strong or bland flavor. It is believed that this product can be combined with higher moisture trim or block cheese at a ratio of from 10–45% of cheese made from my process to 90–55% regular cheese or similar products.

The foregoing description is set forth for illustrative purposes only. It is not meant to be limiting. Therefore, variations, within the scope of the appended claims, may be apparent to those skilled in the art.

I claim:

1. A process for making cheddar cheese including:
   a) separating milk into a cream fraction and a skim milk fraction, and pasteurizing the two said factions;
   b) coagulating a part of the skim milk fraction at temperatures greater than 100° F. to produce curd and whey, said curd retaining albumin proteins from said skim milk fraction;
   c) separating the curd from the whey;
   d) mixing the curd with the cream fraction to produce a curd-cream mixture; and
   e) mixing cultured milk with the curd-cream mixture.

2. The process of claim 1 wherein the coagulating step is performed between 120° and 190° F.

3. The process of claim 1 further including a step of dehydrating the curd.

4. The process of claim, 3 wherein said dehydrating step includes a step of evaporating said curd.

5. The process of claim 4 wherein said dehydrating step further includes a step of salting.

6. The process of claim 3 wherein the dehydrating step reduces the moisture content of the curd to approximately 2%–20%.

7. The process of claim 1 wherein the separating step includes mechanically separating the curd and whey.

8. The process of claim 7 wherein the curd and whey are separated by centrifugal action.

9. The process of claim 1 further including a step of increasing the fat content of the cream fraction.

10. The process of claim 9 wherein the step of increasing the fat content of the cream includes centrifuging said cream fraction.

11. The process of claim 10 further including a step of cooling said cream.

12. The process of claim 11 further including a step of flavoring said cream.

13. The process of claim 12 wherein said step of flavoring said cream includes adding lipolytic enzymes to said cream.

14. The process of claim 1 including a step of culturing a part of said skim milk fraction to produce said cultured milk, said step of culturing said milk including adding a bacterial culture to said milk.

15. The process of claim 14 wherein said step of adding a bacterial culture includes adding a bacteria from the lactobacillus family.

16. A process for making cheddar cheese including:
   a) separating milk into a cream fraction and a skim milk fraction, and pasteurizing the two said fractions;
   b) coagulating a first portion of the skim milk fraction at elevated temperatures to produce curd and whey, said curd retaining albumin proteins from said skim milk fraction;
   c) separating the curd from the whey;
   d) reducing the moisture content of said curd to approximately 2%–20%;
   e) increasing the fat content of the cream fraction while said cream fraction is still hot;
   f) cooling said cream fraction;
   g) mixing the curd with the cream fraction to produce a curd-cream mixture; and
   h) culturing a second portion of said skim milk fraction to produce cultured milk, said step of culturing said milk including adding a bacteria from the lactobacillus family to said milk;
   i) mixing the cultured milk with the curd-cream mixture.

17. The process of claim 16 wherein the coagulating step is performed between 120° and 190° F.

18. The process of claim 16 wherein said step of reducing the moisture content of said cure includes dehydrating said curd by means of evaporation and salting of said curd.

19. The process of claim 16 including a step of flavoring said cream by adding lipolytic enzymes to said cream.

* * * * *

UNITED STATES PATENT AND TRADEMARK OFFICE
CERTIFICATE OF CORRECTION

PATENT NO. : 5,429,829
DATED : July 4, 1995
INVENTOR(S) : John H. Ernster, Sr.

It is certified that error appears in the above-identified patent and that said Letters Patent is hereby corrected as shown below:

Column 3, Claim 1 a), line 26, change "fac-" to ---frac----.

Column 4, claim 18, line 45, change "cure" to ---curd--.

Signed and Sealed this

Tenth Day of October, 1995

Attest:

BRUCE LEHMAN

Attesting Officer        Commissioner of Patents and Trademarks